(12) United States Patent
Shimizu

(10) Patent No.: US 9,800,593 B2
(45) Date of Patent: Oct. 24, 2017

(54) CONTROLLER FOR SOFTWARE DEFINED NETWORKING AND METHOD OF DETECTING ATTACKER

(71) Applicant: FUJITSU LIMITED, Kawasaki-shi, Kanagawa (JP)

(72) Inventor: Sho Shimizu, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 167 days.

(21) Appl. No.: 14/797,601

(22) Filed: Jul. 13, 2015

(65) Prior Publication Data

US 2016/0036839 A1 Feb. 4, 2016

(30) Foreign Application Priority Data

Aug. 4, 2014 (JP) ................................. 2014-158611

(51) Int. Cl.
H04L 29/06 (2006.01)
(52) U.S. Cl.
CPC ...... *H04L 63/1416* (2013.01); *H04L 63/1425* (2013.01)
(58) Field of Classification Search
CPC .......................... H04L 63/1416; H04L 63/1425
See application file for complete search history.

(56) References Cited

U.S. PATENT DOCUMENTS

| | | | |
|---|---|---|---|
| 2007/0157300 A1* | 7/2007 | Sivaradjane | ........ H04L 63/1458 726/9 |
| 2009/0007265 A1* | 1/2009 | Torre | .................... G06F 21/445 726/22 |
| 2011/0099622 A1* | 4/2011 | Lee | .......................... H04L 43/16 726/13 |
| 2013/0046612 A1* | 2/2013 | Prihodko | ............... G06Q 30/00 705/14.41 |
| 2014/0098678 A1* | 4/2014 | Lumezanu | .......... H04L 43/0876 370/248 |

(Continued)

FOREIGN PATENT DOCUMENTS

JP 2007-122749 5/2007
JP 2008-211464 9/2008

OTHER PUBLICATIONS

Seyed Mohammad Mousavi, Early Detection of DDoS Attacks in Software Defined Networks Controller, May 2014 pp. 1-77.*

(Continued)

*Primary Examiner* — Ghodrat Jamshidi
(74) *Attorney, Agent, or Firm* — Staas & Halsey LLP

(57) ABSTRACT

A controller for software defined networking includes a processor. The processor is configured to receive a first request including a first packet from a first communication partner. The processor is configured to generate an inspection message on basis of the first packet. The processor is configured to send the inspection message to the first communication partner. The processor is configured to monitor whether a first phenomenon occurs with respect to the first communication partner after the inspection message is sent. The first phenomenon is expected to occur when an authorized switch performs a process on basis of the inspection message. The processor is configured to determine, when the first phenomenon does not occur, that the first communication partner is not the authorized switch but an attacker.

14 Claims, 14 Drawing Sheets

(56) References Cited

U.S. PATENT DOCUMENTS

| | | | | |
|---|---|---|---|---|
| 2014/0215556 A1* | 7/2014 | Shukla | ................. | H04L 9/3276 |
| | | | | 726/3 |
| 2014/0337674 A1* | 11/2014 | Ivancic | .................. | H04L 43/50 |
| | | | | 714/43 |
| 2015/0089331 A1* | 3/2015 | Skerry | ................ | H04L 43/0823 |
| | | | | 714/799 |

OTHER PUBLICATIONS

Seungwon Shin, Avant-Guard: Scalable and Vigilant Switch Flow Management in Software-Defined Networks, pp. 1-12.*

* cited by examiner

| CLIENT | SESSION | UNIT TIME | NUMBER OF RECEIVED MESSAGES | THRESHOLD |
|--------|---------|-----------|------------------------------|-----------|
| A | ... | x | 1 | y |
| B | ... | x | 10 | y |
| C | ... | x | 100 | y |

⋮

Src MAC: A
Dest MAC: B

Match: (Src MAC == A) AND (Dest MAC == B)
Action: Output: Port 1

Match: (Src MAC == C) AND (Dest MAC == D)
Action: Output: Port 1
Hard timeout: 5 sec

CONTROLLER FOR SOFTWARE DEFINED NETWORKING AND METHOD OF DETECTING ATTACKER

CROSS-REFERENCE TO RELATED APPLICATION

This application is based upon and claims the benefit of priority of the prior Japanese Patent Application No. 2014-158611, filed on Aug. 4, 2014, the entire contents of which are incorporated herein by reference.

FIELD

The embodiments discussed herein are related to a controller for software defined networking and a method (attacker detection method) of detecting an attacker.

BACKGROUND

In recent years, software defined networking (SDN) has attracted attention in the field of networks. In SDN, the entire network is centrally controlled and managed by a device which executes software called a controller. Hereinafter, the device which executes the software is also referred to as a controller. Using SDN, programmability of the network may be improved and automatic control may be realized.

OpenFlow is one technique to realize SDN. A main characteristic of OpenFlow is that a function of controlling a network path and a function of transferring data are separated, while the both functions are implemented on an existing network device.

OpenFlow includes an "OpenFlow controller" (hereinafter referred to as "controller" or "OFC") which performs path control and an "OpenFlow switch" (hereinafter referred to as "switch" or "OFS") which is provided with a data transfer function. Communication between the controller and the switch is performed using an "OpenFlow protocol".

In an OpenFlow network where OpenFlow is applied, control of the entire network is centrally performed by a controller. As a part of control of the entire network, the controller controls respective operations of a plurality of switches with which the controller has established sessions respectively. Thus, management and control of the network is effectively performed.

Related techniques are disclosed in, for example, Japanese Laid-open Patent Publication No. 2007-122749 and Japanese Laid-open Patent Publication No. 2008-211464.

As described above, in an OpenFlow network, a controller centrally performs management and control. For this reason, there is a possibility for a terminal of an unauthorized user (attacker) such as a cracker to come under control of the controller by imitating a switch and to perform a denial-of-service attack (DoS attack) with respect to the controller. When the controller stops operation thereof due to the attack, there is a risk that influence thereof spans the entire network.

In an existing OpenFlow network, it is not possible to determine whether the communication partner under control of the controller is a switch or an attacker.

SUMMARY

According to an aspect of the present invention, provided is a controller for software defined networking. The controller includes a processor. The processor is configured to receive a first request including a first packet from a first communication partner. The processor is configured to generate an inspection message on basis of the first packet. The processor is configured to send the inspection message to the first communication partner. The processor is configured to monitor whether a first phenomenon occurs with respect to the first communication partner after the inspection message is sent. The first phenomenon is expected to occur when an authorized switch performs a process on basis of the inspection message. The processor is configured to determine, when the first phenomenon does not occur, that the first communication partner is not the authorized switch but an attacker.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described below with reference to the drawings. The configurations according to the embodiments are exemplifications, and configurations are not limited to the configurations according to the embodiments.

In the embodiments described below, OpenFlow is targeted, which is the protocol with the most advanced implementation among control protocols for realizing SDN. Hereinafter, OpenFlow may be denoted by "OF".

First Embodiment

Figure 1:
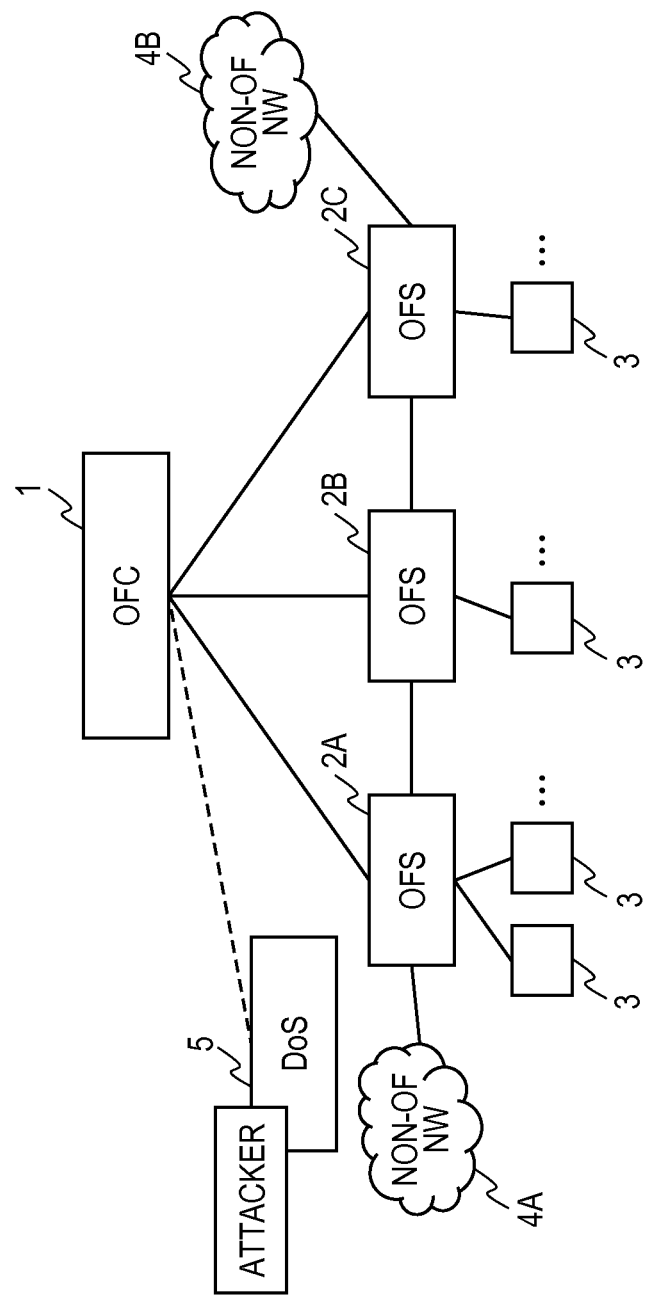
FIG. 1 is a diagram illustrating an exemplary configuration of an OpenFlow network system according to a first embodiment.

FIG. 1 is a diagram illustrating an exemplary configuration of an OF network system according to the first embodiment. In FIG. 1, an OF network system includes a controller 1 (OFC) and at least one switch 2 (OFS) which is under control of the controller 1 (controlled by the controller 1). In the example illustrated in FIG. 1, each switch 2 is connected to the controller 1 via a network.

In the example illustrated in FIG. 1, a plurality of switches 2A, 2B, and 2C are exemplified. The switch 2A is connected to the switch 2B, and the switch 2B is connected to the switch 2C. In the description below, in a case where the switches 2A, 2B, and 2C are not distinguished, they will be referred to as the switch 2. Each switch 2 accommodates one or more hosts 3 (terminals). However, there are also cases where a switch 2 does not accommodate a host 3.

The switch 2A is connected to a non-OF network 4A, and the switch 2C is connected to a non-OF network 4B. In the description below, in a case where the non-OF networks 4A and 4B are not distinguished, they will be referred to as the non-OF network 4. The non-OF network 4 is a network which is constructed with a standard different from OpenFlow, for example, a packet network such as the Internet or intranet where an internet protocol (IP) packet is transferred.

In the configuration above, for example, transfer of a packet which reaches the non-OF network 4B from the non-OF network 4A through each of the switches 2A, 2B, and 2C is performed. Alternatively, a packet the non-OF network 4A or non-OF network 4 is transferred to the terminal 3 via a predetermined switch 2. It is obvious that, packet communication between the terminals 3 which are connected to the switch 2 is also achieved via the switch 2.

The controller 1 establishes a session based on the OF protocol in order to send and receive a message between each switch 2. A procedure for establishing a session is, for example, as follows. To begin with, the switch 2 performs a handshake procedure (three-way handshake) of a transmission control protocol (TCP) with the controller 1 and establishes a TCP session. The TCP session is an example of a "session".

Next, the switch 2 performs a handshake procedure based on the OF standard with the controller 1. In the handshake procedure, the switch 2 and the controller 1 exchange messages called Hello messages, with one another. Next, the switch 2 sends a message called a "features request" which contains information on the switch 2, and the controller 1 replies with a response message called a "features reply" to the "features request". In this manner, the handshake is established based on the OF standard. After this, the switch 2 and the controller 1 send echo messages to one another and the session is maintained.

The controller 1 performs path control with respect to a packet which is received by each switch 2, and generates control information which defines an operation (action) to be performed with respect to the packet which is received by each switch 2. The control information is called "flow" in OF.

A flow is a set of "matching condition (or rule)", "action", and "statistics". The "matching condition" is information which indicates an identification condition (flow defining condition) of a packet which is input in the switch 2, and is mainly expressed by a combination of parameters which are set in a header field of the packet.

The "action" is a definition of an operation (process) content with respect to a packet which matches the "matching condition". The definition of the "action" may include a plurality of operations. When the "action" is not defined, "Drop: packet discard" may be performed.

A number or amount of packets which match the "matching condition" is counted as the "statistics". Such statistics may be used as a condition for executing the "action".

The controller 1 generates an aggregate (called "flow table") of entries (called "flow entries") for each switch 2. One entry corresponds to one flow. The controller 1 generates a message (called "FlowMod message") which includes a flow entry which corresponds to the switch 2. The FlowMod message (hereinafter also referred to as "FM message") is sent to each switch 2 using a session which is established between each switch 2. The FM message is an example of a "control message".

Upon receiving an FM message, the switch 2 (each of the switches 2A, 2B, and 2C) stores a flow entry included in the FM message in a storage device. Thus, the switch 2 stores an aggregate (flow table) of flow entries which are generated by the controller 1 in the storage device.

Upon receiving a packet, the switch 2 refers to the flow table and searches a flow entry which has the "matching condition" which matches the packet. When a flow entry which matches the "matching condition" is found, the switch 2 performs an operation indicated by the "action" in the entry. For example, if the action content is "Output: port 1", the switch 2 sends the packet out from an output port #1.

In this manner, the switch 2 performs, with respect to a packet received by itself, an operation in accordance with a content of a flow (flow entry) received from the controller 1. That is, the operation of the switch 2 is controlled by the flow which is generated by the controller 1.

A time limit (an effective period) may be set in a flow (flow entry) included in an FM message. A flow entry with a time limit is registered in the flow table for the switch 2 in the same manner as a flow entry without a time limit is registered. However, a flow entry with a time limit is removed from the flow table when the time limit arrives, that is, when the effective period has expired.

Upon removing a flow entry with a time limit, the switch 2 sends a message (called a FlowRemoved message) which indicates removal of a flow (expiration of an effective period for a flow) to the controller 1. By receiving a FlowRemoved message (hereinafter referred to as FR message), the controller 1 may detect removal (invalidity) of a flow indicated by the FR message.

As described above, upon receiving each packet, the switch 2 refers to the flow table and searches a flow entry which includes the "matching condition" which matches the packet. In a case where a flow entry which matches the "matching condition" is not found in the search results, the switch 2 sends the message (called a "PacketIn message") which includes the packet to the controller 1. The PacketIn message (hereinafter referred to as "PI message") is a message which indicates reception of a packet for which an operation is not determined (specified).

Upon receiving a PI message, the controller 1 refers to the packet included in the PI message, and generates ae flow (flow entry) for the packet. At this time, the controller 1 refers to header information and the like of the packet and includes, in the flow entry, the "matching condition" for identifying a packet of the same type (that is, a packet having the same attribute information) as the packet.

The controller 1 sends the generated flow entry to the switch 2 of the sending source of the PI message (that is, the switch 2 which has been sent the PI message). The switch 2 registers the flow entry in the flow table. Due to the registration, the switch 2 may find, from the flow table, a flow entry which has the "matching condition" that matches the packet of the same type as the packet which has been included in the PI message. Thus, the switch 2 may perform an operation (process) in accordance with the "action" of the flow entry.

A method of attacking the controller 1 by an unauthorized user (attacker) is considered as follows. As depicted in FIG. 1, a terminal 5 of the attacker may establish a session with the controller 1 by imitating the switch 2 and perform a DoS attack from the terminal 5. As the DoS attack, the terminal 5 sends massive messages to the controller 1, and the controller 1 is in a high load state.

At this time, when the messages are generated in a format in accordance with OF, it is difficult to determine whether the massive messages which are received by the controller 1 are normal messages from the normal (authorized) switch 2, or attack messages which are designed by the attacker.

According to the present embodiment, when a predetermined start trigger is generated, the controller 1 starts an inspection of the established partner (communication partner: also referred to as "connection partner" or "client") of the session. For example, the start trigger is reception of massive messages from a certain client. The type of message does not matter. However, specific messages may be collected. The specific messages include PI messages.

The start trigger is not limited to reception of massive messages. For example, success of the handshake based on the OF standard with a certain client may be set as the start trigger. The start trigger may be set to be generated at regular intervals or periodically in accordance with a predetermined algorithm. The start trigger may be generated for a certain client with which the session is established, and may be generated such that a plurality of clients are to be inspected.

As the inspection of the client, the controller 1 inspects the OF standard conformity (compliance) of the client and determines whether the conduct (behavior) of the client conforms or complies with the OF standard. In a case where the behavior of the client conforms or complies with the OF standard, the controller 1 determines that the client is an authorized switch 2. In contrast to this, in a case where the behavior of the client does not conform or comply with the OF standard, the controller 1 determines that the client is an attacker (attack program).

As an inspection and determination of OF standard conformity, the controller 1 performs the following processes. The controller 1 starts inspection when the predetermined start trigger is generated. That is, the controller 1 assumes that the client to be inspected is a suspected attacker and sends an inspection FM message to the suspected attacker. The inspection FM message is an example of an "inspection message".

Upon receiving the inspection FM message, the suspected attacker may perform a behavior which does not conform or comply to the OF standard. In this case, a phenomenon which occurs if the receiver of the inspection FM message is an authorized switch 2 does not occur concerning the suspected attacker. At this time, the controller 1 determines that the suspected attacker is an attacker. That is, the controller 1 determines that the session with the suspected attacker is an unauthorized session. An example of the inspection method of OF standard conformity (method of detecting an attacker by using an FM message) will be described below.

Figure 2A:
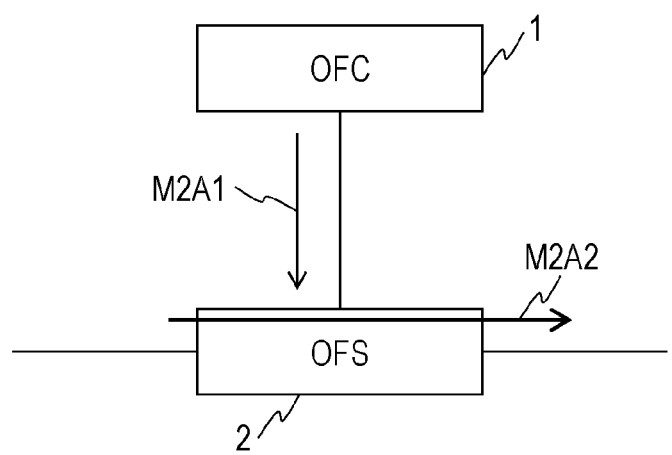
FIG. 2A is a diagram illustrating a first attacker detection method.
Figure 2B:
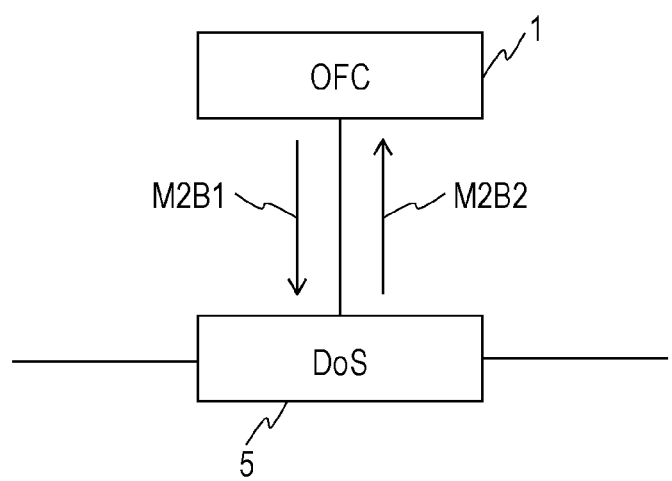
FIG. 2B is a diagram illustrating a first attacker detection method.

FIG. 2A and FIG. 2B are diagrams illustrating a first attacker detection method. FIG. 2A depicts a case where the client is a normal (authorized) switch 2, FIG. 2B depicts a case where the client is an attacker terminal 5.

In FIG. 2A, in a case where the switch 2 is assumed to be a suspected attacker, the controller 1 generates a flow entry in which the "matching condition" and "action" (for example, sending from a predetermined port) are specified with respect to the packet included in the PI message which is received from the switch 2. The controller 1 sends an inspection FM message which includes the flow entry to the switch 2 (M2A1 in FIG. 2A). This inspection FM message is an example of a "first inspection message".

The suspected attacker is an authorized switch 2, therefore the flow entry in the inspection FM message is registered in the flow table. After this, in a case where the same type of packet as the packet included in the PI message is received, the switch 2 performs processes in accordance with the "action" in the flow entry which corresponds to the packet without sending the PI message. That is, the switch 2 sends the packet out from the predetermined port in accordance with the content of the "action" (M2A2 in FIG. 2A).

In this manner, if the suspected attacker is an authorized switch 2, after the FM message with respect to the packet included in the PI message is received, the PI message for a packet of the same type is not sent from the switch 2. Accordingly, viewed from the controller 1, a phenomenon occurs such that the PI message with the same type of packet is not received.

In FIG. 2B, in a case where the suspected attacker is an attacker terminal 5, the attack program which is executed by the terminal 5 is generated to send, to the controller 1, messages which apply a load to the controller 1. For this reason, the attack program is considered not to cover the original function of the switch 2. That is, the attack program is considered not to include a process to be performed upon reception of an FM message.

Accordingly, in the same manner as the description with reference to FIG. 2A, even if the controller 1 sends the inspection FM message to the terminal 5 (M2B1 in FIG. 2B), a flow entry registration process is not performed in the terminal 5. For this reason, the terminal 5 continues to send a PI message related to the DoS attack to the controller 1 (M2B2 in FIG. 2B).

Thus, regardless that the FM message is sent, the controller 1 receives a PI message which contain a packet of the same type (packet which matches the "matching condition" which is sent by the inspection FM message). That is, viewed from the controller 1, the phenomenon (the PI message of the same type of packet is not received), which occurs if the suspected attacker is a switch 2, does not occur.

In other words, as the suspected attacker performs a behavior which is different from the behavior expected to be performed upon reception of the FM message, a phenomenon occurs which does not occur in a case where the switch 2 receives the FM message. Upon receiving the PI message again, the controller 1 determines that the suspected attacker (terminal 5) is an attacker (the session with the terminal 5 is an unauthorized session). In this manner, the attacker (unauthorized session) is detected using an FM message based on the OF standard and the process performed by the switch 2 in response to the FM message.

Figure 3A:
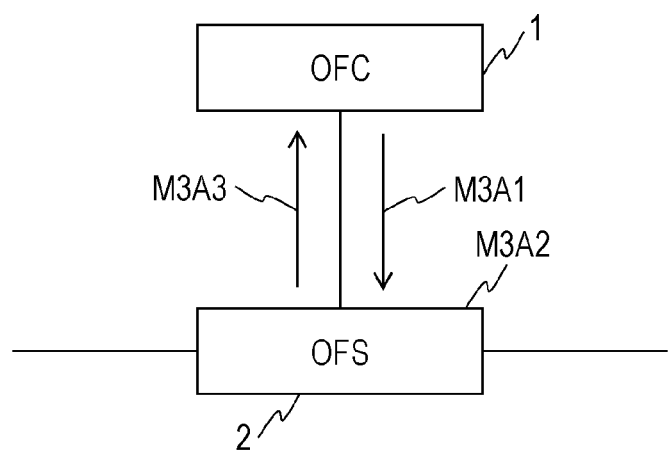
FIG. 3A is a diagram illustrating a second attacker detection method.
Figure 3B:
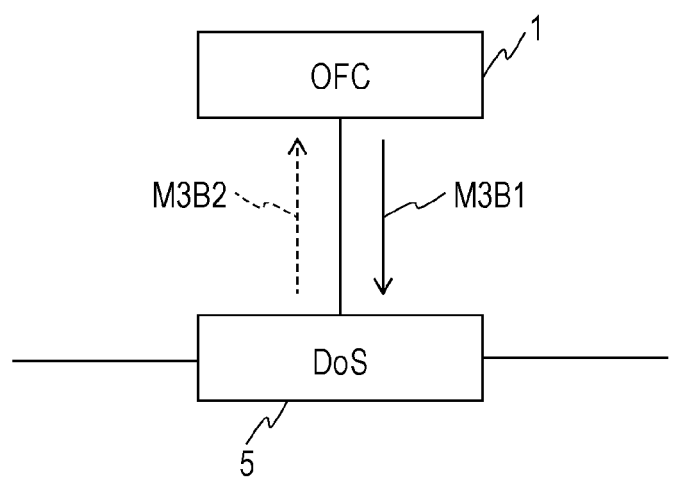
FIG. 3B is a diagram illustrating a second attacker detection method.

FIG. 3A and FIG. 3B are diagrams illustrating a second attacker detection method. FIG. 3A depicts a case where the client is a normal (authorized) switch 2, FIG. 3B depicts a case where the client is an attacker terminal 5.

In FIG. 3A, in a case where the switch 2 is assumed to be a suspected attacker, the controller 1 sends an inspection FM message to the switch 2 (M3A1 in FIG. 3A). The inspection FM message includes a predetermined flow entry for which a time limit (an effective period) is set. The content of the flow entry may be set as appropriate. This inspection FM message is an example of a "second inspection message".

Upon receiving the inspection FM message, the switch 2 registers the flow entry included in the FM message in the flow table. After this, when the effective period for the flow entry has expired, the switch 2 removes the flow entry from the flow table (M3A2 in FIG. 3A). Then, the switch 2 sends an FR message which indicates removal (expiration of the effective period) of the flow entry to the controller 1 (M3A3 in FIG. 3A). This FR message is an example of the "response message".

In this manner, in a case where the inspection FM message is sent to the switch 2, viewed from the controller 1, a phenomenon occurs where the FR message is sent from the switch 2 (received by the controller 1) after the effective period has expired.

As depicted in FIG. 3B, in a case where the suspected attacker is a terminal 5 of the attacker, the attack program which is executed by the terminal 5 is considered not to include a process to be performed upon reception of an FM message, or a process to be performed upon reception of an FM message with a time limit.

For this reason, the terminal 5 receives the inspection FM message (with the time limit) which is sent from the controller 1 (M3B1 in FIG. 3B), and even if the effective period has expired, the FR message is not sent (M3B2 in FIG. 3B). That is, viewed from the controller 1, a phenomenon occurs where the FR message is not received even if the effective period has expired.

For example, if the controller 1 does not receive the FR message from the suspected attacker to which the inspection FM message is sent, the controller 1 determines that the suspected attacker (terminal 5) is an attacker (the session with the terminal 5 is an unauthorized session). In this manner, the attacker (unauthorized session) is detected using an FM message which is defined in OF.

In a case where the controller 1 determines that the client is an attacker (attack program) by using the first and second detection methods described above, the controller 1 typically disconnects the session with the client (terminal 5) and blocks subsequent accesses from the client. Thus, attacks from attackers may be avoided. However, the process upon determining that the client is an attacker is not limited to the above examples.

The background where the first and second detection methods (attacker (unauthorized session) detection methods) described above are effective is considered as follows.

The attack program which is used when the attacker attacks the controller 1 is considered to imitate the operation of the switch 2, and conformity or compliance with the OF standard is not necessarily high.

That is, the attack program is provided with a function of establishing and maintaining a session with the controller 1 in compliance with the OF standard, and a function of sending and receiving messages used for an attack. However, the attack program is considered not to be provided with operations and processes which are not related to attack (incompletely conformed to the OF standard).

Generating an attack program which completely conforms to the OF standard demands a substantially equal amount of work to generate an actual switch 2 (OFS) and development costs of the attack program are very high. In addition, it is considered that asynchronous messages (PI message or the like) to be sent from the switch 2 to the controller 1 are generated to attack the controller 1 (apply a load to the controller 1). In this case, implementation of state (such as the flow table) managed by a normal switch 2 is considered to be omitted since it is not directly related to the attack.

According to the first embodiment, when there are massive accesses (message reception) to the controller 1, it is possible to determine whether the client is an authorized switch 2 or an attack program by adding a simple process using an FM message. That is, a program part for executing the attacker detection method (inspection by an attacked side) described above is added to a program that causes an information processing device (computer) to operate as the controller 1. Thus, the controller 1 may be provided with an attacker detection mechanism.

The attacker detection mechanism (attacker detection method) described above may be combined with another method for avoiding attacks on the controller 1. The other method, for example, is a method in which authentication of a client is performed when the client and the controller 1 are connected, and in a case where authentication is not successful, establishment of a session for the controller 1 and the client is not performed.

The first embodiment will be described below in detail.

Figure 4:
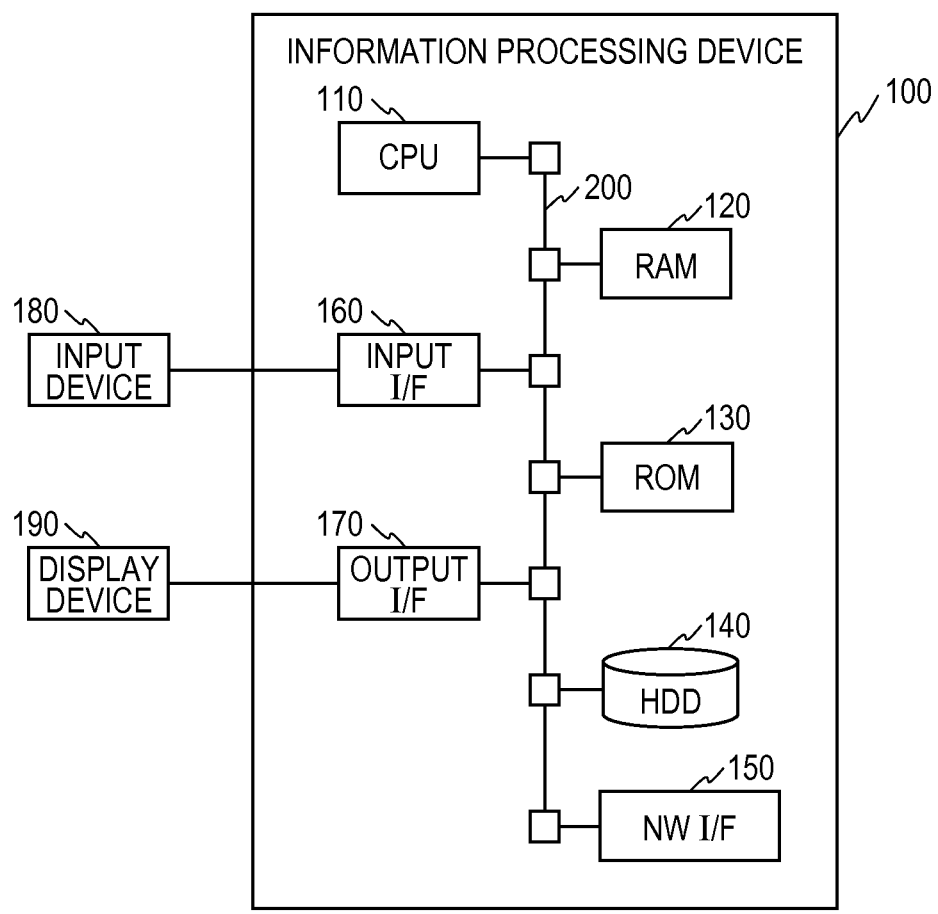
FIG. 4 is a diagram illustrating an exemplary hardware configuration of an information processing device (computer) which is operable as a controller.

FIG. 4 is a diagram illustrating an exemplary hardware configuration of an information processing device 100 (computer) which is operable as the controller 1 described above. For example, the information processing device 100 may be a dedicated or general-purpose computer such as a personal computer (PC), a work station (WS), or a server machine. However, the type of the information processing device 100 is not limited to the exemplifications above.

In FIG. 4, the information processing device 100 includes a central processing unit (CPU) 110, a random access memory (RAM) 120, and a read-only memory (ROM) 130 which are connected to one another via a bus 200. In addition, the information processing device 100 includes a hard disk drive (HDD) 140 and a network interface (NW I/F) 150 which are connected to the bus 200. Furthermore, the information processing device 100 includes an input interface (input I/F) 160 and an output interface (output I/F) 170 which are connected to the bus 200.

The RAM 120 is used as a work region of the CPU 110. The ROM 130 and the HDD 140 each store a program or data which is used when a program is executed. The RAM 120 and the HDD 140 may also store data which is generated as an execution result of the program. Instead of the HDD 140, or in addition to the HDD 140, a solid state drive (SSD) may be included. The RAM 120, ROM 130, HDD 140, and the like are examples of a "storage section", a "storage medium", a "memory", or a "storage device".

An input device 180 is connected to the input I/F 160. The input device 180, for example, includes at least one of a button, a key, a pointing device (such as a mouse), and a touch panel. The input device 180 is used in information or data input.

A display device 190 is connected to the output I/F 170. The display device 190 displays all kinds of information. The NW I/F 150 includes an interface circuit which controls communication and is connected to the switch 2 (client) or the like via a network. The NW I/F 150 may be, for example, a network interface card such as a local area network (LAN) card. The NW I/F 150 is an example of a "sending device", a "reception device", and a "communication device".

The CPU 110 loads the program stored in the ROM 130 or the HDD 140 to the RAM 120 and executes the program. Thus, the information processing device 100 operates as the controller 1. The CPU 110 is an example of a "processor" or a "control device".

By executing the program, the CPU 110 performs various processes which the controller 1 performs. The processes which the CPU 110 performs include a process in which the session (connection) with the client (switch 2) is established and disconnected, a process in which a flow entry is generated (calculated), and a process in which communication (exchange of messages) with the switch 2 using the OF protocol is performed.

The flow entry (flow table) generated for each switch 2 is sent to each switch 2 using the FM message, and is stored in at least one of the RAM 120 and the HDD 140. Furthermore, the CPU 110 performs a process in which the attacker described above is detected (the suspected attacker is inspected).

The information processing device 100 may operate as the switch 2 when the CPU 110 executes a program for the switch 2. The CPU 110 of the information processing device 100 which operates as the switch 2, for example, performs the following processes.

The CPU 110 performs a process in which a flow entry included in an FM message received from the controller 1 which is received through the NW I/F 150 is registered in a flow table stored in a storage region of the RAM 120 or the HDD 140. In addition, the CPU 110 searches for the flow entry, which corresponds to a packet received through the NW I/F 150, from the flow table and performs an operation, which is defined by the "action" of the flow entry that is found, on the packet.

When the flow entry which corresponds to the packet is not found, the CPU 110 performs a process in which a PI message is sent to the controller 1. Furthermore, in a case where a flow entry with an effective period is removed from the flow table, the CPU 110 performs a process in which an FR message is generated and sent to the controller 1. The processes which are performed by the switch 2 are processes which conform or comply to the OF standard.

Figure 5:
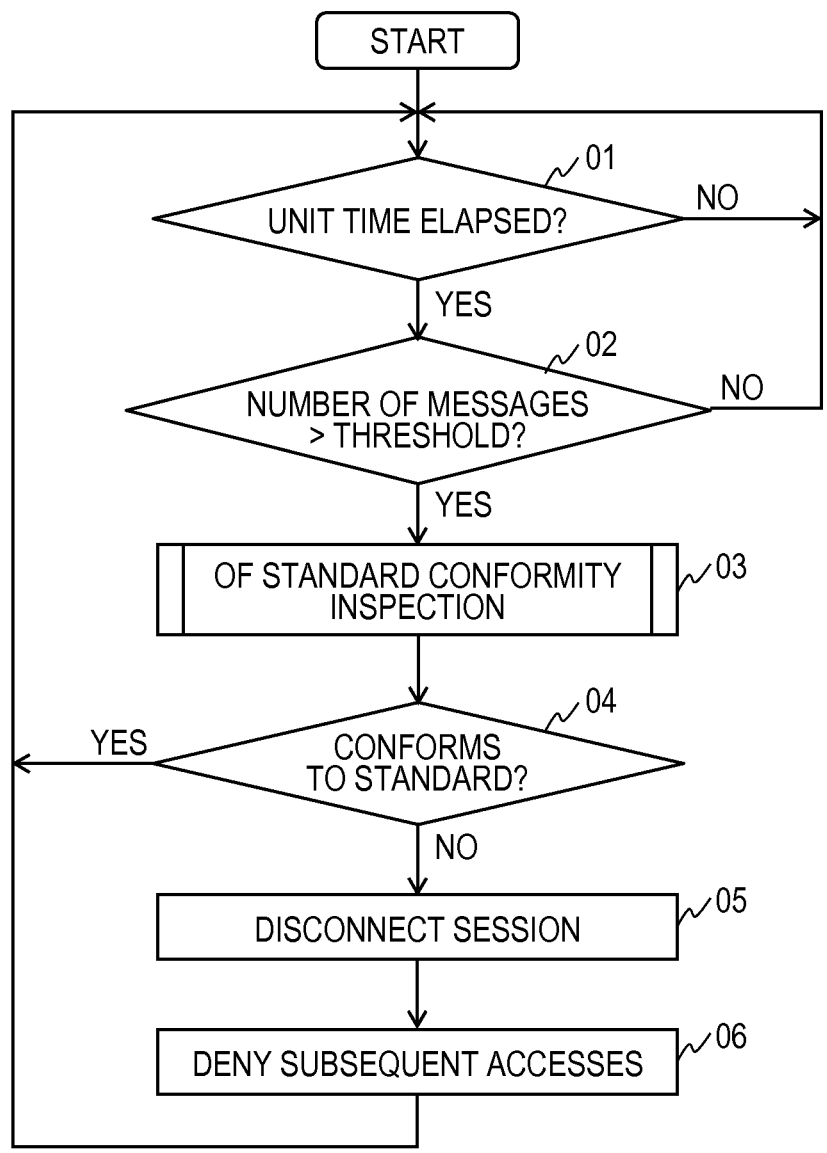
FIG. 5 is a flowchart illustrating an example of an attacker detection process.

FIG. 5 is a flowchart illustrating an example of an attacker detection process (process for checking whether the client is an attack program). The process depicted in FIG. 5 is performed by the CPU 110 of the information processing device 100 which operates as the controller 1. As an example, the process as depicted in FIG. 5 is started when the controller 1 receives massive PI messages from a client (under control of the controller 1) with which the controller 1 has established a session.

Figures 6, 7:
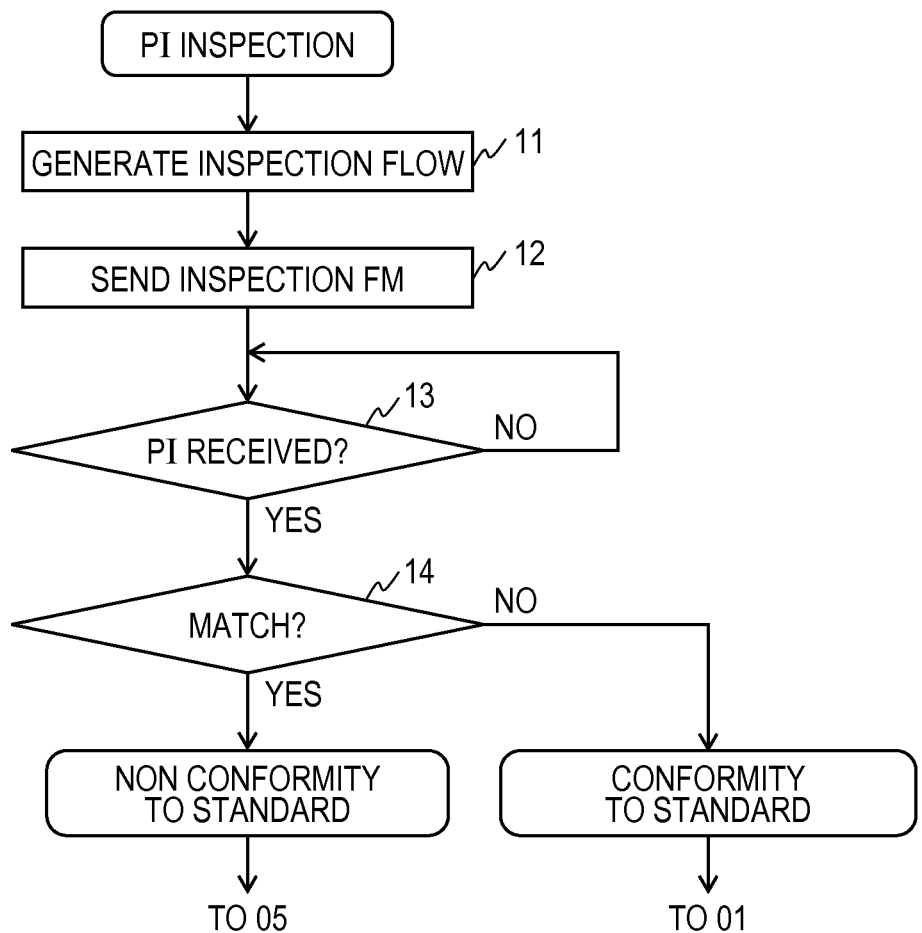
FIG. 6 is a diagram illustrating an example of a table indicating information which is used during a detection process.
FIG. 7 is a flowchart illustrating a first inspection method (PI inspection) which is a detailed example of an inspection phase depicted in FIG. 5.

FIG. 6 is a diagram illustrating an example of a table indicating information which is used during the detection process. The table is stored in the RAM 120 or the HDD 140. However, the storage format of information which is contained in the table is not limited to the table. In the example of FIG. 6, for each client the table contains items of "client" which indicates identification information on the client, "session" which indicates identification information on the session which is established with the client, a "unit time", a "number of received messages", and "threshold".

The "client" is identification information of the communication partner that establishes a session with the controller 1, and normally, is identification information of the switch 2. The identification information of the client may be, for example, a Datapath ID (DPID) which is an identifier in conformity to the OF standard. During the handshake procedure between the client and the controller 1, the DPI is contained in a predetermined message and transmitted to the controller 1. The predetermined message contains a "features request". However, any information other than DPI may be applied as long as the clients are distinguishable based on the information.

The "session" includes information for sending and receiving messages to and from the communication partner using the session. The "session" is typically an identifier (combination of an IP address and a port number) which is used in a TCP session. However, the "session" is not limited to the above.

A predetermined length of time may be set to the "unit time". In FIG. 6, an example is depicted where a unit time (x) which is the same among clients is set. However, a different time may be set to the "unit time" for each client. The unit time is counted by a timer which is not depicted in the drawings.

A number of messages received from the client within the unit time is stored in the "number of received messages". The type of message which is counted is not limited, and the total number of all types of messages may be counted. Alternatively, a number of messages of a specific type may be counted. The specific types of messages include PI messages.

The "threshold" is a threshold for determining that the controller 1 has received enough amount of messages to determine the client to be a suspected attacker. An appropriate number value is set to the "threshold". In the example of FIG. 6, the same value "y" is set to the "threshold". However, a different threshold may be set to the "threshold" for each client.

The process depicted in FIG. 5 is started at an appropriate timing. First, the CPU 110 counts the unit time "x" using a timer which is not depicted in the drawings. When the unit time elapses (the timer has expired) (Yes in 01), the process proceeds to 02. During the unit time, the CPU 110 counts the number of messages received from each of the clients and stores the number in the table.

In 02, the CPU 110 compares the number of received messages stored in the table with the threshold, and determines whether the number of messages received within the unit time is greater than the threshold. If the number of messages is equal to or less than the threshold (No in 02), the process returns to 01 to reset the timer and count the subsequent unit time. When the number of messages is greater than the threshold (Yes in 02), the process proceeds to 03.

The process in 02 is executed for each client. In a case where "No" is determined in 02 for all of the clients, the process returns to 01. In a case where "Yes" is determined for some of the clients, the CPU 110 performs the processes in 03 and after, in which the CPU 110 treats each of the relevant clients as a suspected attacker. Here, a comparative determination between the number of received messages and the threshold may be made according to whether the number of received messages is equal to or more than the threshold.

In 03, the CPU 110 performs inspection of conformity of the client to the OF standard. That is, the CPU 110 checks whether the conduct (behavior) of the client conforms or complies with the OF standard.

In a case where the detection result indicates that the behavior of the client conforms or complies with the OF standard (Yes in 04), the CPU 110 determines that the client is an authorized switch 2, and the process returns to 01. In a case where the behavior of the client does not conform or comply with the OF standard (No in 04), the CPU 110 determines that the client is an attacker (an attack program), then the CPU 110 disconnects the session with the client (05) and performs a setting to deny subsequent accesses from the client (06). After this, the CPU 110 returns the process to 01.

As a process of disconnecting the session, an aggressive session disconnection (completion) sequence with the attacker (terminal 5) may be performed or a response to an echo message received from the attacker may be stopped. However, the method of disconnecting the session is not limited to the methods described above.

As a setting to deny accesses, for example, there is the following method. That is, the CPU 110 stores the DPI and IP address of the client, or a combination of the DPI and IP address in the RAM 120 or the HDD 140. When the stored DPI or IP address is presented from the client during the subsequent session establishment process (handshake), the CPU 110 rejects the handshake. Here, in addition to the combination of the DPI and the IP address, a socket number used in the previous handshake may be used. The setting to deny accesses is not limited to the method described above.

FIG. 7 is a flowchart illustrating a first inspection method (also referred to as "PI inspection") which is an example of an inspection phase depicted in 03 of FIG. 5. The PI inspection is a process in which the first attacker detection method described with reference to FIG. 2A and FIG. 2B is performed.

The process depicted in FIG. 7 is realized, for example, by executing a sub-routine which is invoked in the inspection phase (03 of FIG. 5) for inspecting OF standard conformity of the client. First, the CPU 110 performs setting of an inspection flow which matches the PI message received from the client (suspected attacker) by the controller 1 (11).

That is, the CPU 110 awaits reception of a PI message from the client (suspected attacker) and when the PI message is received, analyses the packet included in the PI message. The CPU 110 newly generates a flow (flow entry) that matches the packet included in the PI message on the basis of the analysis of the packets, for inspection of the suspected attacker.

In detail, the CPU 110 uses a parameter which is set in the packet header in the PI message or the like to generate a "matching condition (rule)" which matches the packet and determines the "action" which corresponds to the matching condition. As long as it is possible to detect a packet which matches the "matching condition", the content of the "action" may be set as appropriate. A dummy action may be set as the "action".

The CPU 110 includes the inspection flow (flow entry) which contains the newly generated "matching condition" and "action" in an FM message for the client (sending source of the PI message) to generate an inspection FM message.

The CPU 110 sends the inspection FM message to the client (suspected attacker), as an inspection message (first inspection message) (12).

After this, the CPU 110 is in a state in which the CPU 110 monitors reception of a PI message from the client (13). When a PI message is received (Yes in 13), the CPU 110 determines whether the packet included in the PI message matches the inspection flow (14). In a case where the packet does not match the inspection flow (No in 14), the CPU 110 determines that the behavior of the client conforms or complies to the OF standard. That is, the CPU 110 determines that the client is an authorized switch 2. After this, the CPU 110 terminates execution of the sub-routine, and the process returns to 01 of FIG. 5.

In a case where the packet matches the inspection flow (Yes in 14), the CPU 110 determines that the behavior of the client (suspected attacker) does not conform (comply) to the OF standard, that is, the client is an attacker (attack program). After this, the CPU 110 terminates execution of the sub-routine, and the process returns to 05 of FIG. 5.

Figure 8A:
FIG. 8A is a diagram illustrating an example of a PacketIn message.

A specific example of the PI inspection illustrated in FIG. 7 will be described. FIG. 8A is a diagram illustrating a PI message. As depicted in FIG. 8A, the PI message includes a PI header and a payload. The payload contains a packet which is received by the client and for which no flow is yet set.

The CPU 110 performs analysis of the packet in 11 of FIG. 7. As depicted in FIG. 8A, it is assumed that a source media access control (MAC) address (Src MAC) is set as "A" and a destination MAC address (Dest MAC) is set as "B" in the packet included in the PI message. Therefore, the CPU 110 performs path calculation for a packet flow from the MAC address "A" to the MAC address "B" and an output port for the client is determined. At this time, it is assumed that an output port #1 is determined.

Accordingly, the CPU 110 determines the "matching condition" for a received packet as that the source MAC address is "A" and the destination MAC address is "B". In addition, the CPU 110 determines the "action" which corresponds to the "matching condition" as that the packet is to be output from the output port #1 ("output: port 1"). Then, a flow entry for inspection is generated which includes the "matching condition" and the "action" described above.

Figure 8B:
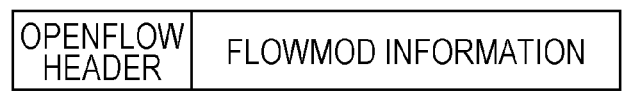
FIG. 8B is a diagram illustrating an example of a Flow-Mod message.

The CPU 110 includes the flow entry for inspection in an FM message for the client (sending source of the PI message). FIG. 8B is a diagram illustrating the FM message. As depicted in FIG. 8B, the FM message includes an OF header and an FM information storage region. A flow entry for inspection of the client is stored in the storage region. That is, "Match: (Src MAC==A) and (Dest MAC==B)" and "Action: Output: Port 1" are set as the "matching condition" and "action", respectively, in the storage region.

In 12 of FIG. 7, the CPU 110 sends an FM message which contains the flow entry for inspection such as depicted in FIG. 8B to the client (suspected attacker). After the FM message is sent, in a case where a PI message, which contains a packet that matches the "matching condition" described above, is received by the controller 1, the CPU 110 determines that the client is an attacker.

In the first inspection method (PI inspection) described above, an FM message which includes an inspection flow that includes the "matching condition" to be matched with a packet included in the payload of the received PI message is sent to the client. After this, in a case where a PI message which includes a packet which matches the inspection flow is received, the CPU 110 determines that the client is an unauthorized attack program.

In a case where the FM message is received by a switch 2 which conforms to the OF standard, the flow entry included in the FM message is registered (the flow is set) in the flow table. After this, in a case where a packet which matches the flow arrives at the switch 2, the switch 2 detects the flow entry which matches the packet and performs an operation according to the "action" contained in the flow entry. Thus, the switch 2 does not send a PI message which includes the packet to the controller 1. This is normal behavior conforming and complying with the OF standard.

An attack program has a function of sending a PI message to the controller 1 as a function for applying a load to the controller 1 to be attacked. In contrast to this, managing the state of the flow table is not a necessary operation for an attack. For this reason, the attack program may be considered to disregard the FM message received from the controller 1 and sends a PI message which includes a packet which matches the flow included in the FM message. Accordingly, an unauthorized attack program may be detected by the PI inspection.

Figure 9:
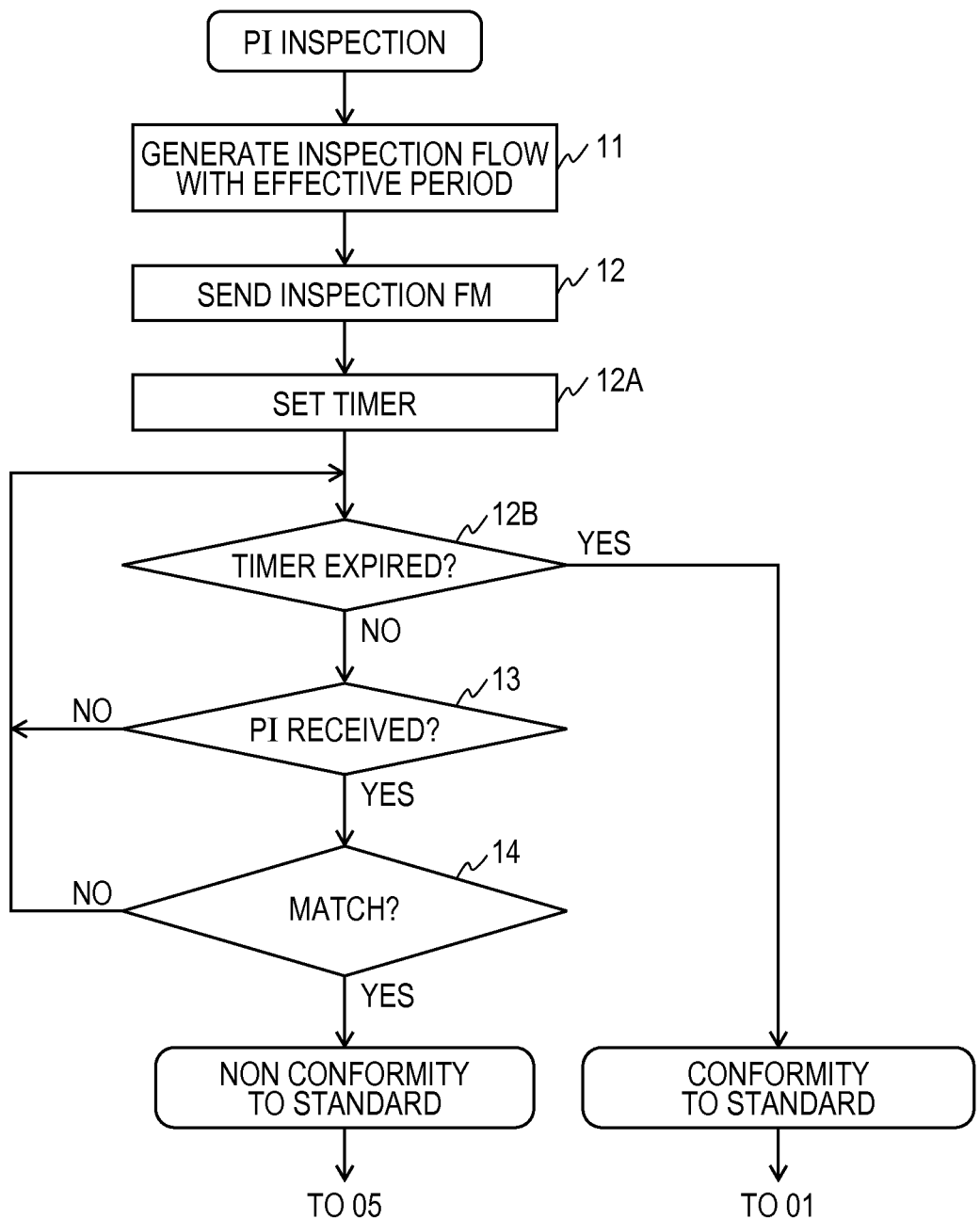
FIG. 9 is a flowchart illustrating a modified example of PI inspection depicted in FIG. 7.

FIG. 9 is a flowchart illustrating a modified example of the PI inspection depicted in FIG. 7. In 11 and 12 of FIG. 9, the flow entry for inspection contained in the FM message sent to the client by the controller 1 (CPU 110) is set with an effective period. In 12A, the CPU 110 starts counting a timer (which is not depicted in the drawings) for the effective period. After this, the expiration of the timer is monitored (12B).

When a packet included in a received PI message matches the "matching condition" of the inspection flow (13 and 14) before the timer expires (No in 12B), the CPU 110 determines that the client is an attacker. In contrast to this, when the timer has expired without a PI message, which contains a packet that matches the "matching condition" of the inspection flow, is received (Yes in 12B), the CPU 110 determines that the client is an authorized switch 2.

According to the modified example, it is possible to adjust the period (length) of inspection using the effective period for the flow. That is, it is possible to avoid needlessly continuing inspection until the same type of PI message is received. In addition, if the effective period has expired, the flow entry registered in the switch 2 is removed, therefore after the inspection FM message is sent, it is possible to avoid performing an operation in consideration of the inspection flow at the controller 1 side. For example, it is possible to limit an action (dummy action) which is set for inspection within the effective period.

Figure 10:
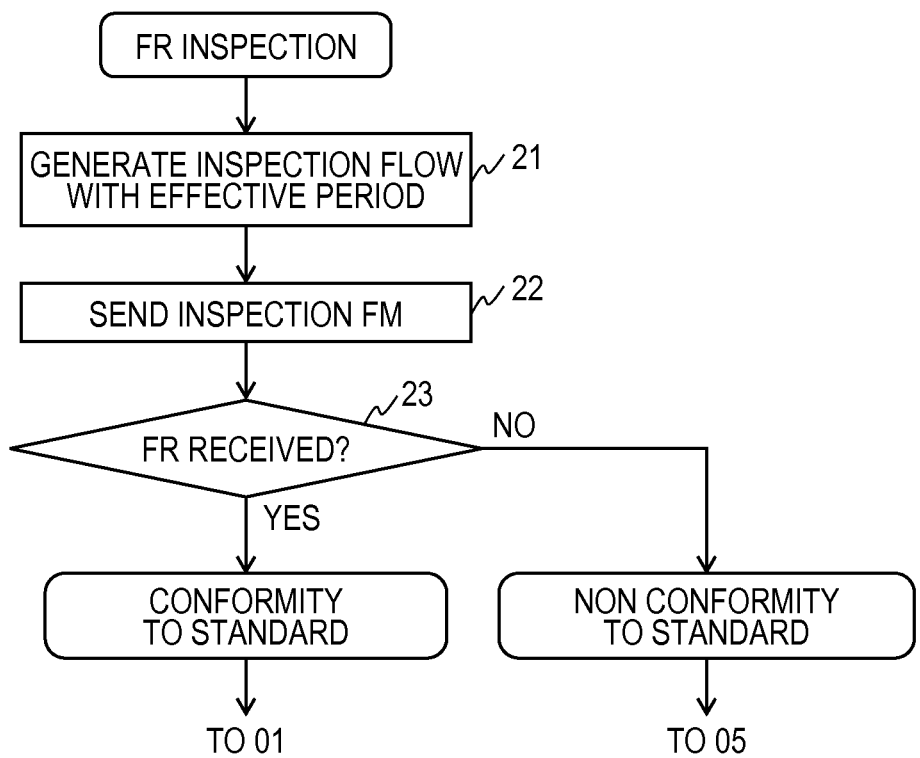
FIG. 10 is a flowchart illustrating a second inspection method (FR inspection) which is a detailed example of an inspection phase depicted in FIG. 5.

FIG. 10 is a flowchart illustrating a second inspection method (also referred to as "FR inspection") which is an example of the inspection phase depicted in 03 of FIG. 5. The FR inspection is a process in which the second attacker detection method described with reference to FIG. 3A and FIG. 3B is performed.

The process depicted in FIG. 10 is realized, for example, by executing a sub-routine which is invoked in the inspection phase (03 of FIG. 5) for inspecting OF standard conformity of the client. First, the CPU 110 performs setting of an inspection flow (generating a flow entry) which is effective for a certain period (with an effective period) with respect to the client (suspected attacker) (21).

The CPU 110 sends an inspection FM message, which contains a flow entry generated in 21, to the client (suspected attacker) (22). After this, the CPU 110 is in a state of waiting to receive an FR message with respect to the flow which is sent by the inspection FM message (23).

In a case where an FR message is received (Yes in 23), the CPU 110 determines that the behavior of the client conforms or complies to the OF standard. That is, the CPU 110 determines that the client is the authorized switch 2. After this, the CPU 110 terminates execution of the sub-routine, and the process returns to 01 (FIG. 5).

In contrast to this, in a case where an FR message is not received (No in 23), the CPU 110 determines that the behavior of the client (suspected attacker) does not conform or comply to the OF standard, that is, that the client is an attacker (attack program). After this, the CPU 110 terminates execution of the sub-routine, and the process returns to 05 (FIG. 5).

As described above, in the FR inspection, the CPU 110 (controller 1) issues, with regard to the client, an FM message including a flow which is effective for a certain period. In a case where the client conforms to the OF standard, the client removes the flow entry included in the FM message after a specified period, and sends an FR message to the controller 1 upon the removal.

In consideration of the operation of the switch 2, the CPU 110 checks whether the FR message is issued after a certain period on the basis of the issued FM message. Thus, whether the behavior of the client conforms to the OF standard may be checked. Accordingly, in a case where it is not possible to receive an FR message, the CPU 110 determines that the client is an unauthorized attack program.

Conduct with respect to the FM message is not an essential function to be performed for attack. The behavior which conforms to the OF standard in relation to the FR message is performed by implementing management of the flow state. Therefore, man hours (labor) are expended in implementation. Accordingly, since the attack program may be considered not to have processes for the flow management and sending a FR message, the attacker may be detected using the FR inspection.

Figure 11:
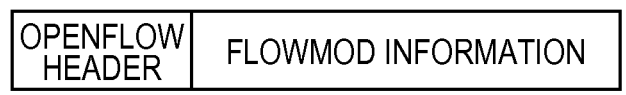
FIG. 11 is a diagram illustrating an example of an FM message with an effective period, which is used in FR inspection.

FIG. 11 is a diagram illustrating an example of an FM message with an effective period which is used in the FR inspection. The controller 1 (CPU 110) which has assumed that a certain client is a suspected attacker sets a flow with an effective period, which is different from an existing flow which is set with respect to the suspected attacker.

In the example depicted in FIG. 11, the FM message contains a flow in which the "matching condition" indicates that the source MAC address is "C" and the destination MAC address is "D", and the "action" indicates that a packet which matches the "matching condition" is to be output from the output port #1. The FM message also contains "Hard timeout: 5 sec", which indicates that an effective period for the flow is 5 seconds.

The CPU 110 sends an inspection FM message as depicted in FIG. 11 to the suspected attacker and the behavior of the suspected attacker is observed. That is, the CPU 110 inspects conformity to the OF standard by checking whether an FR message is received from the suspected attacker within five seconds from the sending of the FM message. If an FR message is not received, the CPU 110 determines that the suspected attacker is an unauthorized attack program (attacker).

Figure 12:
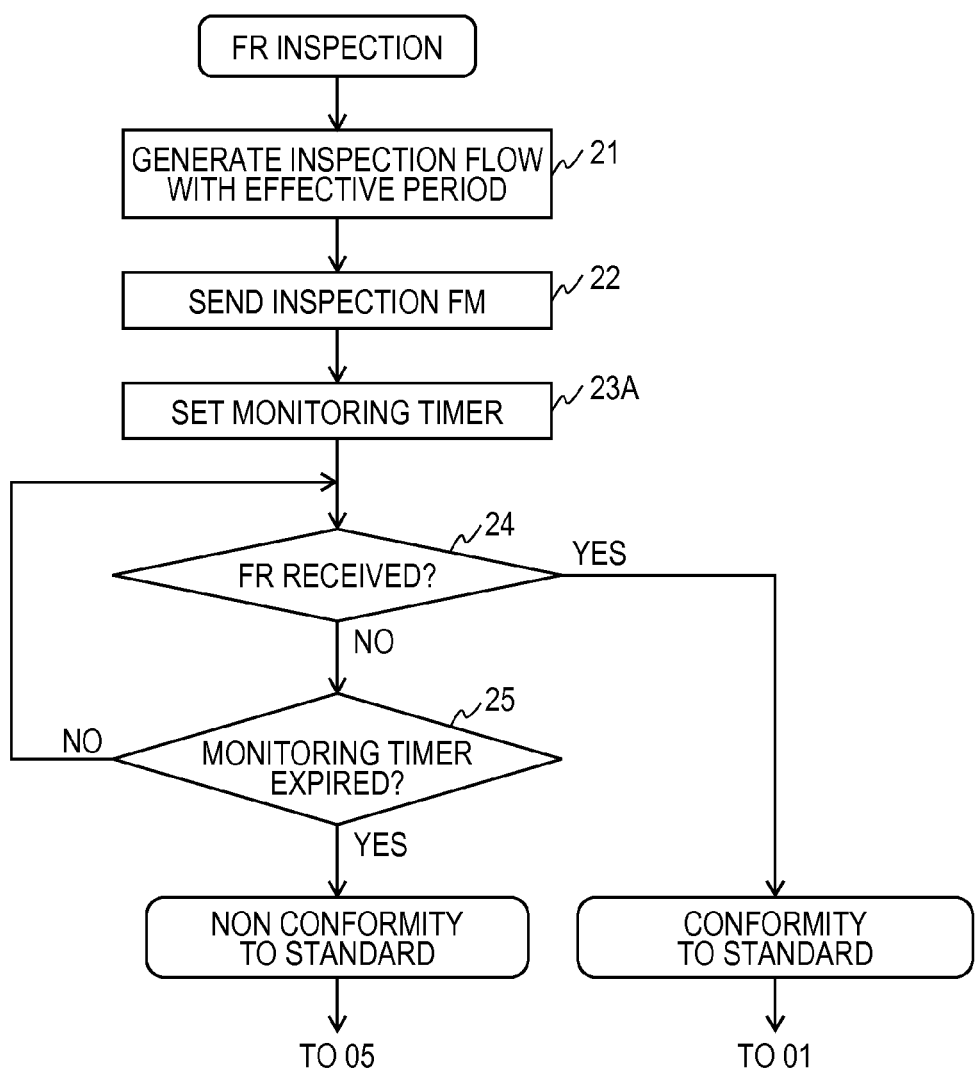
FIG. 12 is a flowchart illustrating a modified example of FR inspection depicted in FIG. 10.

FIG. 12 is a flowchart illustrating a first modified example of the FR inspection depicted in FIG. 10. Among the processes depicted in FIG. 12, the processes after 22 are different from the processes of FIG. 10 as follows. That is, after the inspection FM message is sent in 22, the CPU 110 performs setting of a monitoring timer which is not depicted in the drawings (23A).

The counting time of the monitoring timer is a time derived by adding a predetermined period to the effective period set in the FM message. In a case where an FR message is received (Yes in 24) before the monitoring timer has expired (No in 25), the CPU 110 determines that the client is a switch 2 which conforms to the OF standard. In contrast to this, when no FR message is received (No in 24) and the monitoring timer has expired (Yes in 25), the CPU 110 determines that the client is an attack program that does not conform to the OF standard. According to the first modified example of the FR inspection, since the reception time limit of an FR message is set by the monitoring timer, needless lengthening of the inspection period may be avoided.

When the FR inspection is performed in a case where a fault in the network occurs between the controller 1 and an authorized switch 2, the controller 1 may determine no conformity due to non-arrival of an FR message to the controller 1 which is caused by the network fault.

Figure 13:
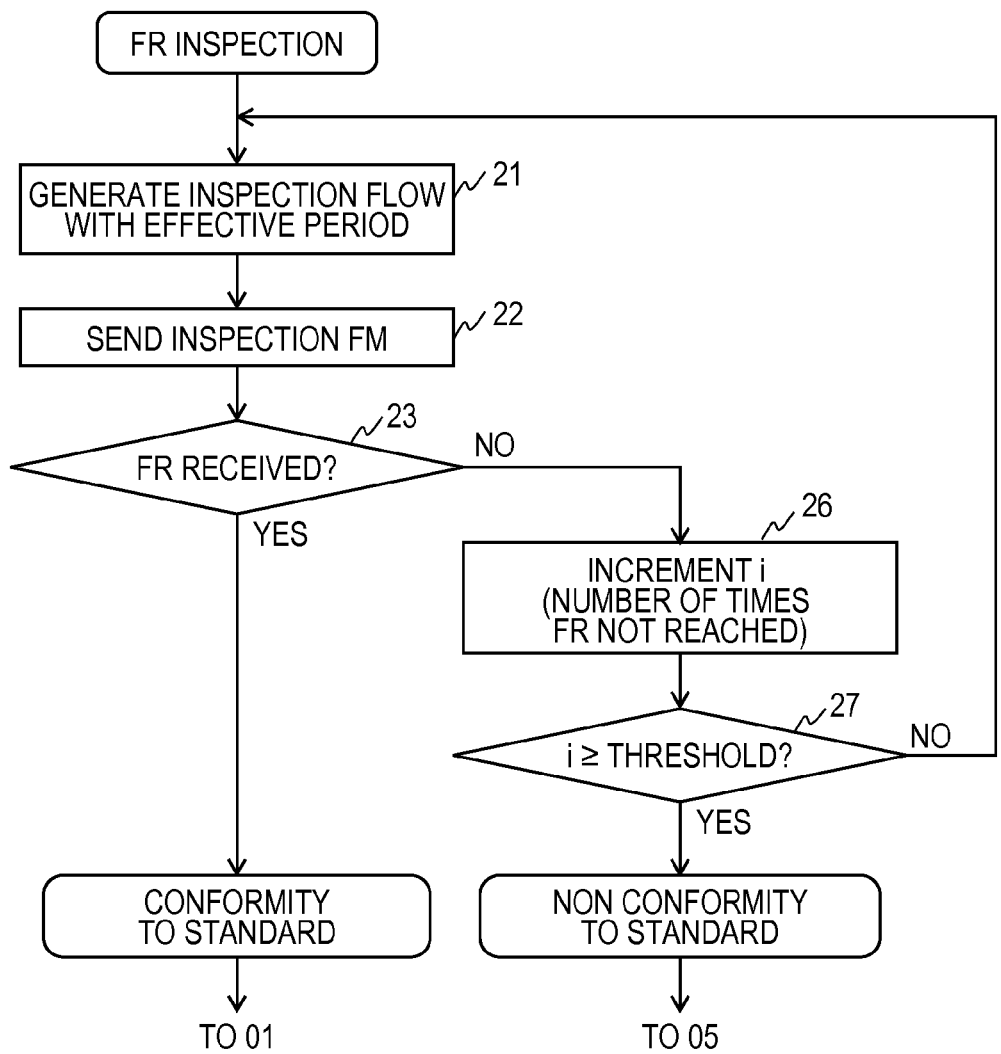
FIG. 13 is a flowchart illustrating a modified example of FR inspection depicted in FIG. 10.

FIG. 13 is a flowchart illustrating a second modified example of the FR inspection depicted in FIG. 10. In FIG. 13, when it is determined that an FR message is not received (No in 23), the CPU 110 performs the following process. That is, the CPU 110 increments the value of a variable i (initial value=0) which is set in advance in the RAM 120 and indicates the number of times of non-arrival of an FR message (26). Then, the CPU 110 determines whether the current value of i is equal to or more than a threshold which is prepared in advance (27).

If the value of i is equal to or more than the threshold, non-arrival of an FR message occurs in a plurality of FR inspections by a certain number of times in succession. Therefore, the CPU 110 determines that the client is an attacker. If the value of i is below the threshold, the process returns to 21.

In this manner, in the second modified example, the FR inspections (sending of second inspection messages) are performed a predetermined number of times with respect to the client, and when an FR message (response message) is received for no second inspection message, the client is determined to be an attacker. Thus, according to second modified example of the FR inspection, it may be avoided that an authorized switch 2 is determined to be an attacker due to non-arrival of an FR message. In FIG. 13, an upper limit may be provided in the number of the FR inspections.

Figure 14:
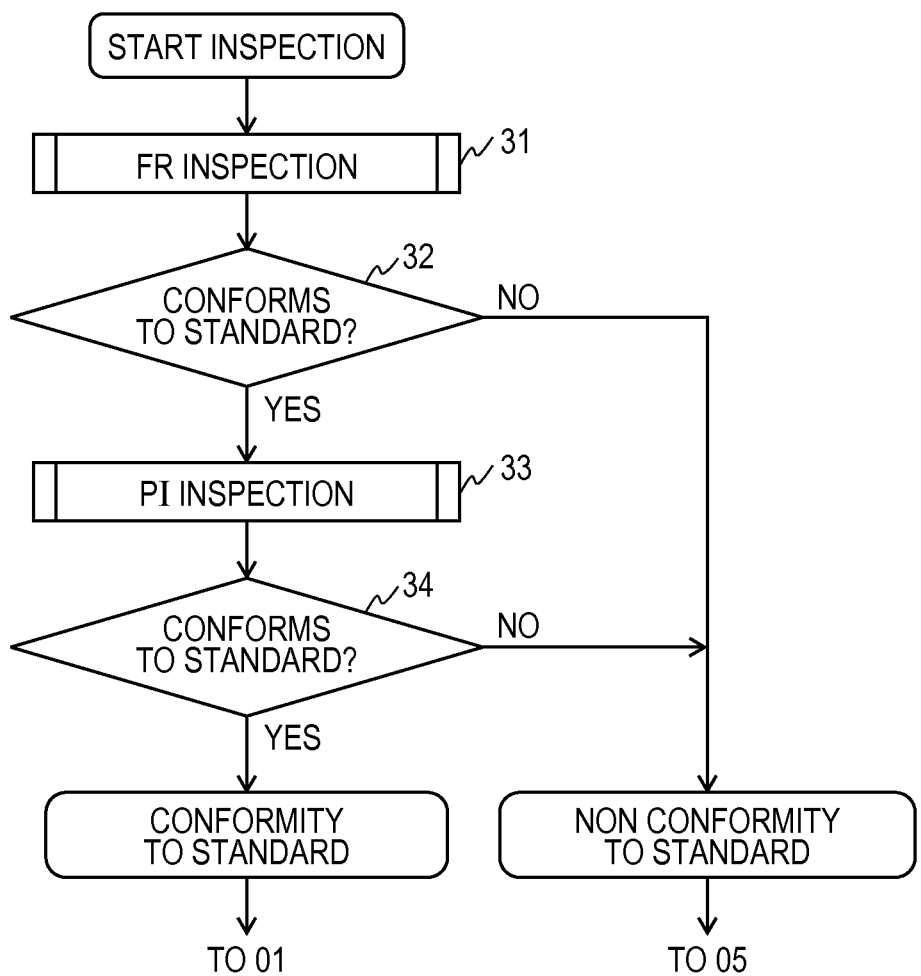
FIG. 14 is a flowchart illustrating a third inspection method (composite inspection) which is a detailed example of an inspection phase depicted in FIG. 5.

FIG. 14 is a flowchart illustrating a third inspection method (also referred to as "composite inspection") which is an example of the inspection phase depicted in 03 of FIG. 5. The composite inspection is a process in which both of the PI inspection and the FR inspection are performed.

In FIG. 14, when inspection is started, the CPU 110 performs the FR inspection illustrated in FIG. 10 (31). Then, the CPU 110 determines whether the client conforms (complies) to the OF standard on the basis of the results of the FR inspection. In a case where the client does not conform to the OF standard (No in 32), the CPU 110 determines that the client is an attacker, and the process proceeds to 05 (FIG. 5).

In contrast to this, in a case where the client conforms to the OF standard (Yes in 32), the CPU 110 performs the PI inspection illustrated in FIG. 7 (33). Then, the CPU 110 determines whether the client conforms (complies) to the OF standard on the basis of the results of the PI inspection. In a case where the client does not conform to the OF standard (No in 34), the CPU 110 determines that the client is an attacker, and the process proceeds to 05 (FIG. 5). In contrast to this, in a case where the client conforms to the OF standard (Yes in 34), the CPU 110 determines that the client is an authorized switch 2, and the process returns to 01 (FIG. 5).

As illustrated in FIG. 14, the composite inspection in which a plurality of inspections are combined may be performed. In the example illustrated in FIG. 14, out of the PI inspection and the FR inspection, the FR inspection which has insignificant influence on flow setting compared to the PI inspection is performed first and the flow state in the switch 2 is less changed. That is, since the flow is removed in the FR inspection upon expiration of the effective period, in a case where the suspected attacker is an authorized switch 2, influence due to the operation according to the flow is slight. However, the order of the FR inspection and the PI inspection may be reversed. In addition, the modified example depicted in FIG. 9 may be adopted as the PI inspection, and first modified example depicted in FIG. 12 and second modified example depicted in FIG. 13 may be adopted as the FR inspection.

According to the first embodiment, it is possible to detect, by inspecting using an FM message, a terminal 5 (an attacker) that performs the DoS attack. At this time, it is possible to stop the DoS attack by disconnecting the session with the terminal 5. In addition, it is possible to avoid further DoS attacks by denying accesses.

An inspection mechanism may be implemented by adding a short routine (program) for inspection to the existing algorithm according to the OF standard such as flow generation and FM message issuance. When mounting the inspection mechanism, it is not desired to modify hardware of the information processing device 100 or add hardware thereto. Therefore, it is easy to implement.

Second Embodiment

A second embodiment will be described below. The configuration of the second embodiment has common points with the configuration of the first embodiment. Therefore, the different points are mainly described, and description of common points is omitted.

Figure 15:
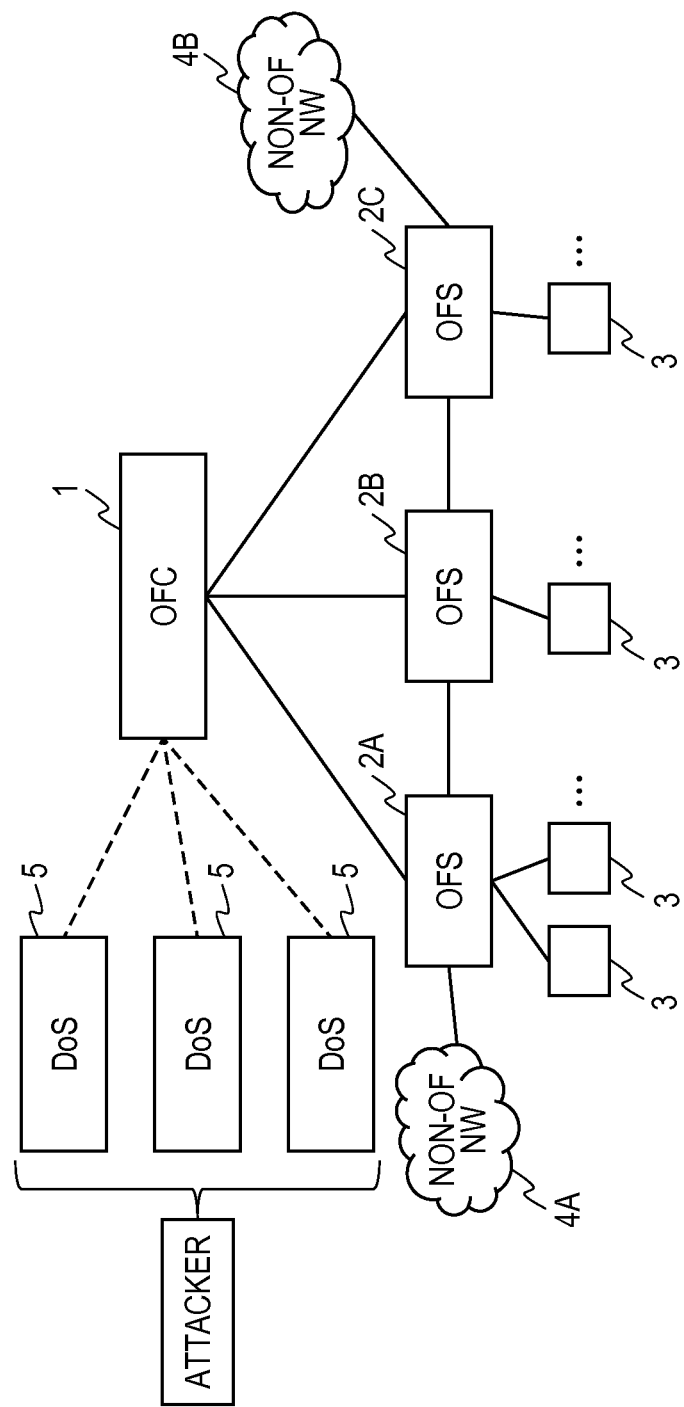
FIG. 15 is a diagram illustrating an exemplary OpenFlow network system according to a second embodiment.

FIG. 15 illustrates an example of an OF network system according to the second embodiment. Compared to the OF network system illustrated in FIG. 1, there are no modifications in the configuration of the controller 1 (OFC) and the switch 2 (OFS). However, in FIG. 15, a certain attacker establishes sessions between each of a plurality of the terminals 5 and the controller 1, and performs a distributed denial of service attack (DDoS attack) using the terminals 5.

An attacker detection method with respect to the DDoS attack which uses the plurality of terminals 5 will be described as the second embodiment, as distinct from the DoS attack which uses a single terminal 5 which is depicted in the first embodiment. In the DDoS attack, the attacker is considered to send a smaller amount of messages from each of the terminals 5 to the controller 1 than the massive messages in the case of the single DoS attack. However, the controller 1 may receive messages equal to or more than the single DoS attack.

In this case, there may be cases where inspection of each terminal 5 as a suspected attacker is not performed in the first embodiment since the number of messages received from each terminal 5 does not exceed the threshold. Therefore, according to the second embodiment, a total number of messages received from all clients in the unit time is counted, and in a case where the total number of messages exceeds a threshold (predetermined value), inspection is performed for all clients. In this manner, an attacker (plurality of terminals 5) that is melt in the clients may be revealed.

Figure 16:
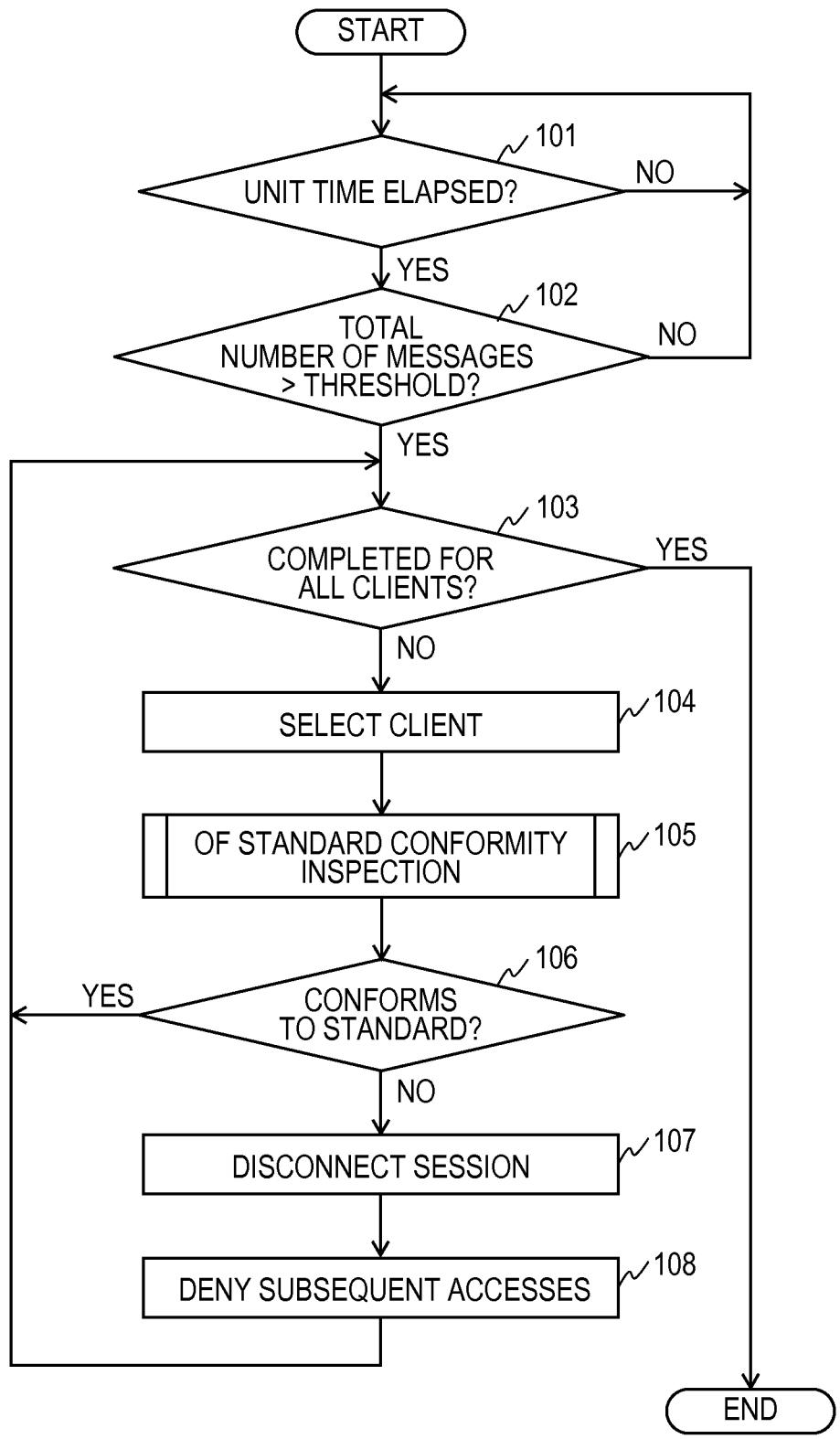
FIG. 16 is a flowchart illustrating an example of a process performed by a controller (CPU) according to a second embodiment.

FIG. 16 is a flowchart illustrating an example of a process performed by the controller 1 (CPU 110) according to the second embodiment. First, the CPU 110 performs counting of a unit time using a timer (101). For example, the unit time "x" for individual clients in the table depicted in FIG. 6 may be applied as the counting period of the timer.

When the unit time elapses (Yes in 101), the CPU 110 determines whether the total number of messages exceeds the threshold (102). That is, the CPU 110 calculates the total number of messages by summing up the "number of received messages" stored in the table (FIG. 6) for each client, and comparing the total number of messages to a threshold (for example, the threshold "y"). At this time, if the total number of messages does not exceed the threshold (No in 102), the process returns to 101. In contrast to this, if the total number of messages exceeds the threshold (Yes in 102), the process proceeds to 103.

Here, a period different from the unit time "x" for individual clients may be applied as the unit time. Alternatively, based on differences in the unit times, the total number of received messages may be counted separately to the "number of received messages" for each client. A threshold different from the threshold "y" may be stored in advance as the threshold for the total number of received messages in the table or another storage region.

The CPU 110 determines whether inspection is completed for all clients (103). In a case where inspection is completed for all clients (Yes in 103), the CPU 110 completes the process in FIG. 16. Alternatively, the process may return to 101.

In a case where inspection is not complete for some clients (No in 103), the CPU 110 selects a client for which inspection has not been performed (104) and performs the OF standard conformity inspection for the selected client (105). In 105, any of the first to third inspection methods described above may be applied.

The CPU 110 determines whether the inspection result in 105 indicates OF standard conformity of the client (106). In a case where the client conforms or complies with the OF standard (Yes in 106), the process proceeds to 103. In a case where the client does not conform or comply with the OF standard (No in 106), the CPU 110 disconnects the client from the session (107) and performs a setting to deny subsequent accesses from the client (108). After this, the CPU 110 returns the process to 103.

According to the second embodiment, the similar effects to that of the first embodiment are obtained. According to the second embodiment, the controller 1 (CPU 110) performs inspection of all clients, and if a client is determined to be an attacker, disconnects a session with the client and denies further accesses from the client. Thus, the DDoS attack may be avoided. Both of the processes described in the first and second embodiments may be performed by an information processing device 100 which operates as one controller 1.

In the embodiments described above, OpenFlow is given as an example of the protocol, but the protocol is not limited to OpenFlow. That is, the embodiments may be applied to a network where a controller sends a message similar to a FlowMod message in OpenFlow to a subordinate (under control) switch and the switch exhibits behavior similar to that of a switch which conforms or complies with OpenFlow upon receipt of a FlowMod message. In this case, the network includes an SDN.

The configurations of the embodiments described above may be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A controller for software defined networking, the controller comprising:
   a memory; and
   a hardware processor coupled to the memory, the hardware processor configured to receive first requests from a first communication partner;
   count a number of the received first requests;
   determine whether the number of the received first requests is larger than a predetermined threshold value;
   generate, upon determining that the number of the received first requests is larger than the predetermined threshold value, an inspection message on basis of a first packet included in one of the received first requests;
   send the inspection message to the first communication partner, the inspection message including an effective time period;
   monitor whether a first phenomenon occurs with respect to the first communication partner within the effective time period, the first phenomenon being expected to occur when an authorized switch performs a process on basis of the inspection message; and
   determine, when the first phenomenon does not occur within the effective time period, that the first communication partner is not the authorized switch but an attacker.

2. The controller according to claim 1, wherein
   the processor is configured to
   determine that the first communication partner is an attacker when a first message is received from the first communication partner after the inspection message is sent, the first message being expected not to be received from the authorized switch.

3. The controller according to claim 1, wherein
   the processor is configured to
   determine that the first communication partner is an attacker when a first message is not received from the first communication partner after the inspection message is sent, the first message being expected to be received from the authorized switch.

4. The controller according to claim 1, wherein
   the processor is configured to
   generate a first inspection message including a condition for identifying the first packet;
   send the first inspection message to the first communication partner;
   receive a second request including a second packet from the first communication partner after the first inspection message is sent; and
   determine that the first communication partner is an attacker when the second packet matches the condition.

5. The controller according to claim 4, wherein
   the processor is configured to
   set a first effective time period; and determine that the first communication partner is an attacker when the second request is received from the first communication partner before the first effective time period has expired and the second packet matches the condition.

6. The controller according to claim 4, wherein
the controller is an OpenFlow controller,
the first request is a PacketIn message in OpenFlow, and
the first inspection message is a FlowMod message in OpenFlow, in which an identification condition and an operation is defined, the identification condition being for identifying a packet included in the PacketIn message, the operation being to be applied on a packet which matches the identification condition.

7. The controller according to claim 1, wherein
the processor is configured to
generate a first inspection message including the effective time period;
send the first inspection message to the first communication partner; and
determine that the first communication partner is an attacker when a response message is not received from the first communication partner after the first inspection message is sent, the response message indicating that the effective time period has expired.

8. The controller according to claim 7, wherein
the processor is configured to
generate, when the response message is received from the first communication partner, a second inspection message including a condition for identifying the first packet;
send the second inspection message to the first communication partner;
receive a second request including a second packet from the first communication partner after the second inspection message is sent; and
determine that the first communication partner is an attacker when the second packet matches the condition.

9. The controller according to claim 7, wherein
the processor is configured to
set a timer which expires after the effective time period expires; and
determine that the first communication partner is an attacker when the response message is not received before the timer has expired.

10. The controller according to claim 7, wherein
the processor is configured to
send the first inspection message to the first communication partner a predetermined number of times; and
determine that the first communication partner is an attacker when the response message is not received for any of the predetermined number of times of the sending.

11. The controller according to claim 7, wherein
the controller is an OpenFlow controller,
the first inspection message is a FlowMod message with an effective time period in OpenFlow, and
the response message is a FlowRemoved message in OpenFlow.

12. The controller according to claim 1, wherein
the processor is configured to
send the inspection message to the first communication partner when a number of messages, which are received from the first communication partner within a unit time, exceeds a threshold value.

13. The controller according to claim 1, wherein
the processor is configured to
receive requests including respective packets from communication partners including the first communication partner;
generate inspection messages on basis of the respective packets when a number of messages, which are received from the communication partners within a unit time, exceeds a threshold value; and
send the inspection messages to the respective communication partners.

14. A method of detecting an attacker, the method comprising:
receiving, by a computer, first requests from a first communication partner;
counting a number of the received first requests;
determining whether the number of the received first requests is larger than a predetermined threshold value;
generating, upon determining that the number of the received first requests is larger than the predetermined threshold value, an inspection message on basis of a first packet included in one of the received first requests;
sending the inspection message to the first communication partner, the inspection message including an effective time period;
monitoring whether a first phenomenon occurs with respect to the first communication partner within the effective time period, the first phenomenon being expected to occur when an authorized switch performs a process on basis of the inspection message; and
determining, when the first phenomenon does not occur within the effective time period, that the first communication partner is not the authorized switch but an attacker.

* * * * *